Patented July 11, 1950

2,514,479

UNITED STATES PATENT OFFICE 2,514,479

PROCESS OF PREVENTING RANCIDITY OF COOKING FATS

Earl B. Doolin, Dallas, Tex.

No Drawing. Application December 21, 1948, Serial No. 66,569

4 Claims. (Cl. 99—163)

This invention relates to a process of handling cooking fats, and more particularly to a process of storing cooking fats during periods of non-use.

The prime object of this invention is to provide a process of handling cooking fats or oil during periods of non-use to prevent rancidity of the fat or oil.

Another main object of the invention is to provide a process wherein cooking fats or oil may be easily and quickly stored over a long period of time wherein the formation of peroxides in the fats or oil is prevented during such periods of storage.

More specifically, an object of the invention is to enable cooking fats or oil to be stored in an easy and convenient manner near cooking vats when the cooking operation is shut down, so that the oil will not become rancid and may easily be transferred back into the cooking vats when it is desired to resume cooking operation.

While the invention is applicable to many types of food industries, it has been found to be ideally suitable in connection with the manufacture of corn chips, potato chips and the cooking of other starchy substances. While the invention is capable of preventing cooking fats and oil from becoming rancid during non-cooking periods, it has been found to be particularly suitable in connection with vegetable cooking oils, such as corn oil, cottonseed oil, peanut oil, soy bean oil and the like, which oils are particuarly susceptible to rancidity by the formation of peroxides therein.

In the manufacture of corn chips, potato chips and the like, it is customary to provide a large vat in which a vegetable oil such as corn oil, etc., is placed, the oil being heated to a temperature of from 330° F. to 420° F., and normally from 400° F. to 420° F. The corn ribbons or the slices of potatoes are immersed in the hot cooking oil for a sufficient length of time to entirely cook the starchy substance. When the oil is at the normal cooking temperature of from 330° F. to 420° F., and more particularly in the range of from 400° F. to 420° F., the oil is sufficiently hot to oxidize all of the oxygen occurring in the air, and the oil may be used over a long period without any danger of the same becoming rancid. However, in the normal operation of the industry in question, it is customary to cook the food products more or less in batches and to shut down the cooking operation after a suitable quantity of ribbons or chips have been cooked. When the cooking operation has ceased, the storage of the cooking oil becomes a serious problem. If the oil is allowed to remain in the cooking vats, or even if the oil is drawn from the cooking vats and placed into closed containers, the oil will in time become so rancid that it is unfit for further use. It has been found that a vegetable cooking oil containing over 12.0 peroxides is always so rancid that it is unusable, while a vegetable cooking oil containing from 10.0 to 12.0 peroxides is usually, although not always, so rancid that it is unusable for its intended purpose. Accordingly, it is necessary to keep the peroxides at least below 10.0 in order to insure re-use of the oil when it is again desired to cook with the same.

This problem has been confronting the corn and potato chip industry for years and, so far as applicant is aware, has not heretofore been solved. In order to set forth a complete disclosure of the present invention, it is believed advisable to set forth the laboratory analysis of vegetable cooking oil to determine the peroxide number, and the numbers relating to peroxides are given as a result of the usual laboratory analysis as set forth hereinafter:

*Peroxide number—laboratory analysis*

A 5 gram portion of fat (plus or minus 0.05 gm.) is weighed into a 200–300 cc. Erlenmeyer flask and dissolved in 40 cc. of a mixture of 60% acetic acid and 40% chloroform. To the solution is then added 1.0 cc. of saturated potassium iodide solution and the flask shaken until the solution becomes clear. After about two minutes 30 cc. of water are added and the mixture titrated with 0.01 N. sodium thiosulphate, using starch solution as an indicator. The flask should be shaken vigorously near the end of the titration to liberate all the iodine from the chloroform layer. The number of milli-equivalents of sodium thiosulphate required to titrate the iodine liberated by one kilogram of fat is taken as the active oxygen number of the fat.

Milli-equivalents per 1000 grams of fat =

$$\frac{\text{cc. titration} \times N}{\text{weight of sample}} \times 1000$$

It has been found that a vegetable cooking oil, such as corn oil, cottonseed oil, peanut oil, soy bean oil, mixtures thereof and the like, will not oxidize and, accordingly, there will be no peroxides formed therein when the oil is heated to the normal cooking temperature which, in the corn chip and potato chip industries, is from 400° F. to 420° F. The extreme heat within this temperature range drives out or burns all oxygen from the oil and prevents oxygen from the surrounding air from combining with the oil. It has also been found that vegetable cooking oil, as well as other cooking fats (vegetable or animal), which is maintained at a temperature of from 330° F. or more will not combine with oxygen, although fats which are permitted to drop below 330° F. will combine with oxygen and form peroxides. It has been found that fats which have been heated to 420° F. and thereafter placed in an open container having no lid thereon and allowed to cool for a 72-hour period will have 20.0 peroxides. As the upper safe limit for peroxides in cooking fats is 10.0, and as cooking fats having peroxides of 12.0 are so rancid that they are always unusable for cooking purposes, it is, therefore, necessary to keep the peroxides at least as low as 12.0 and preferably below 10.0.

Again, experiments have shown that cooking fats which have been heated to approximately 420° F. and then placed in containers and a tight lid placed on the container will have, after cooling for a 72-hour period, peroxides of as high as 13.2.

In order to prevent the formation of peroxides and hence prevent rancidity of the fats, it is necessary to store the fats, after the cooking operation, in either a heated condition and maintain the oil at a temperature of 330° F. or above, or to store the fats in such a manner that all oxygen is absolutely excluded therefrom. The first method is, of course, impractical.

In the corn and potato chip industry, a vegetable cooking oil is normally maintained at 400° F. to 420° F. during cooking operation. In other industries, the oil or fats need not be at so high a temperature, although it is necessary to maintain the same at a temperature of at least 330° F. to prevent them from becoming rancid, even during cooking operation. In the corn and potato chip industry, the cooking process is normally shut down at the close of the day and is frequently shut down after a batch operation. In this industry, the oil is maintained at from 400° F. to 420° F. during the cooking operation. After cooking is stopped, I have found that if the oil is immediately transferred into a large steel container, which container may be placed in close proximity to the cooking vat so as to be convenient thereto, and the oil is transferred either by pumping the same into the vat or permitting the same to flow by gravity therein while the oil is in its highly heated condition, and the tank or container is completely filled with oil so as to force all the air out of the container and the container is then sealed, the oil will not become rancid even after long periods of storage. It is essential, however, that the oil be at a temperature of at least 330° F. or higher when it is being transferred from the vat to the container, and the oil must be at a temperature of 330° F. or above during the container-filling operation. It is also essential that the container be completely filled with oil, even to the point of overflowing, so as to displace all air normally contained within the container. If the oil is at a temperature of 330° F. or above when it is in and completely fills the container, the oxygen contained in the air displaced by the oil cannot combine with the oil to form peroxides as the temperature is sufficiently high to prevent such oxidation. Immediately upon the complete filling of the container, the container must then be sealed and be made absolutely air-tight. Upon cooling of the oil, the oil will contract and thus form a vacuum within the container. The oil may be stored in such condition for long periods of time and may be later transferred to the cooking vats for cooking purposes.

In actual test, experiments have shown that the oil can be held in the vacuum storage container for a period of 72 hours and still contain approximately the same degree of peroxides that it contained when it was transferred into the tank. A specific example of the invention is as follows:

A vegetable cooking corn oil was pumped from the cooking vats at a temperature of between 400° F. and 420° F. A sample of the oil being transferred was tested for peroxides in accordance with the aforementioned test and was found to contain 2.8 peroxides. The oil was maintained at this high degree of temperature until the same completely filled the storage container and until the oil actually overflowed therefrom, thus assuring that all the air in the storage container had been displaced. The container was then sealed and the oil was stored for 72 hours. As the oil cooled, substantial contraction took place which, in turn, caused a substantial vacuum within the tank. After 72 hours of storage, the oil was again tested and found to have, in accordance with the same laboratory analysis indicated above, peroxides of 1.8. When the oil was removed from the storage tank and once again heated to cooking temperatures of from 400° F. to 420° F., it was again tested and found that the peroxides were 2.4, thereby establishing conclusively that the oil had the same stability after storage as it had before and, as a matter of fact, contained fewer peroxides than it did when it was first placed in storage. Of course, it is not to be assumed that this oil will continue to contain fewer peroxides each time that it is stored. This .4 peroxide variation will occur in either a positive or negative manner, i. e., the oil at the time it is re-heated after the 72-hour storage period will vary between 3.2 peroxides to 2.4 peroxides.

Of course, it is desirable and, in some instances, necessary to be particularly careful in transferring the oil from the storage container back to the cooking vats when it is desired to perform cooking operations and, again, the oil should be exposed to as little oxygen as possible. The oil, after a long period of storage, will have assumed a temperature much lower than 330° F. and, accordingly, any air or oxygen contacting the same will increase the peroxide percentage and, in time, such peroxides will have reached or gone beyond the upper safe limit of 10.0. In order to prevent the formation of peroxides during the transfer of the oil from the storage container to the cooking vats, I have found that if the oil is pumped from the storage container through a pipe line leading from the storage container to the cooking vats under pressure, while a vacuum is being maintained in the storage container, and the oil is rapidly heated to the aforementioned cooking temperatures or at least to a temperature of above 330° F. no peroxides will be formed. It is, of course, usually necessary to gradually open the storage container as the oil is being pumped therefrom in order to effectively remove the oil from the storage container. However, this gradual opening of the storage container should be effected in such a manner that there is always a partial vacuum within the storage container until after the oil has been completely removed therefrom.

The type of storage container may be of any construction but it should be sufficiently strong to withstand the high vacuum which is created by the cooling oil. It has been found that a rectangularly shaped steel container which can rest upon the floor or foundation of the building in proximity to the cooking vat is preferable. One end of the tank should contain an opening for cleaning purposes, although such opening should have a plug which will maintain the tank air-tight when storage takes place. There should be another opening at the top of the tank for the insertion of the hot cooking oil and this latter opening should be placed in a position where, when the oil rises to the opening and actually overflows therefrom, all air in the container will have been displaced. This latter opening should also be capable of being sealed air-tight and the seal should be sufficiently strong to withstand the vacuum aforementioned. Any suitable means may be provided for partially venting the latter seal when oil is being pumped from the storage tank back into the cooking vats so as to relieve the higher vacuum which would normally take place as the oil is forced from the storage container back into the cooking vats. The venting should be performed, however, in such a manner that a partial vacuum is always maintained in the container until after all of the oil has been removed therefrom.

I claim:

1. The process of storing used cooking fats which have been heated to cooking temperatures to prevent rancidity and prevent peroxides of more than 12.0 from forming in the fats during periods of non-use, which includes the steps of heating the fats to a temperature of at least 330° F., placing the fats into a container capable of being made air-tight and completely filling the container with the fats while the temperature of the same is at least 330° F. to thereby displace all air from the container, sealing the container to make the same air-tight, and thereafter permitting the fats to cool and contract to form a vacuum in the container and storing the cooled fats in such condition until they are ready for re-use.

2. The process of storing cooking fats to prevent rancidity and prevent peroxides of more than 12.0 from forming in the fats after they have been used for cooking purposes in a cooking vat and wherein the fats have been heated to a temperature of from 330° F. to 420° F., which includes the steps of transferring the fats from the cooking vat to a storage container capable of being made air-tight, completely filling the container with the fats to displace all of the air from the container, maintaining the fats at a temperature of at least 330° F. during the transferring and filling steps, sealing the completely filled container and thereafter permitting the fats to cool and contract to form a vacuum in the container, thereby excluding all oxygen from the fats while they are being stored.

3. The process of handling cooking oil used for cooking corn chips, potato chips and other starchy substances wherein the oil is heated to from 330° F. to 420° F. during the cooking period in a cooking vat and wherein the temperature of the oil is permittted to drop below 330° F. during non-cooking periods so as to prevent rancidity and prevent peroxides of more than 12.0 from forming in the oil during non-cooking periods, which includes the steps of transferring the oil from the cooking vat to a storage container capable of being made and maintained air-tight, completely filling the container to displace all air therefrom, maintaining the oil at a temperature between 330° F. and 420° F. during the transferring and filling steps and until the container is sealed, sealing the completely filled container to exclude all air therefrom, and permitting the oil to cool below 330° F. and contract to form a vacuum in the container, and storing the oil under such conditions until it is ready for re-use.

4. The process as set forth in claim 3 further including the steps of transferring the oil from the container to the cooking vat, under pressure, gradually opening the container as the oil is being transferred therefrom to maintain a partial vacuum in the container until the oil has been transferred into the cooking vat and quickly heating the oil in the cooking vat to a temperature of at least 330° F.

E. B. DOOLIN.

REFERENCES CITED

The following references are of record in the file of this patent:

Emery et al.: Jr. Ind. and Eng. Chem., Oct. 1922, pages 937–940.

Chem. Abst., vol. 34, 3114 (1940).